US006126165A

United States Patent [19]

Sakamoto

[11] Patent Number: 6,126,165

[45] Date of Patent: Oct. 3, 2000

[54] GAME MACHINE WITH A HIT EXPECTATION SOUND EMITTING FUNCTION

[75] Inventor: Yoshikazu Sakamoto, Tokyo, Japan

[73] Assignee: Aruze Corporation, Tokyo, Japan

[21] Appl. No.: 09/188,689

[22] Filed: Nov. 10, 1998

[30] Foreign Application Priority Data

Nov. 10, 1997 [JP] Japan .................................... 9-323806

[51] Int. Cl.$^{7}$ ............................ G07F 17/34; A63F 13/00

[52] U.S. Cl. ........................................ 273/143 R; 463/20

[58] Field of Search ............................ 273/143 R, 138.1, 273/138.2; 463/20

[56] References Cited

U.S. PATENT DOCUMENTS

| | | | |
|---|---|---|---|
| 4,618,150 | 10/1986 | Kimura | 273/143 |
| 4,624,459 | 11/1986 | Kaufman | 273/143 |
| 5,018,737 | 5/1991 | Okada | 273/143 R |
| 5,024,439 | 6/1991 | Okada | 273/143 R |
| 5,695,188 | 12/1997 | Ishibashi | 273/143 R |
| 5,713,572 | 2/1998 | Hagiwara | 2273/138.3 |
| 5,803,451 | 9/1998 | Kelly et al. | 273/118 |

FOREIGN PATENT DOCUMENTS

| | | |
|---|---|---|
| 0 391 667 | 10/1990 | European Pat. Off. . |
| 0 414 427 | 2/1991 | European Pat. Off. . |
| 0 720 129 | 7/1996 | European Pat. Off. . |
| 0 875 870 | 11/1998 | European Pat. Off. . |
| 38 30 648 | 3/1990 | Germany . |
| 62-127086 | 6/1987 | Japan . |
| 9-271559 | 10/1997 | Japan . |
| 9-309735 | 10/1997 | Japan . |
| 10-33750 | 2/1998 | Japan . |
| 10-305128 | 11/1998 | Japan . |
| 2 057 738 | 4/1981 | United Kingdom . |
| 2 117 155 | 10/1983 | United Kingdom . |
| 2 147 442 | 5/1985 | United Kingdom . |
| 2 326 260 | 12/1998 | United Kingdom . |

*Primary Examiner*—Benjamin H. Layno
*Attorney, Agent, or Firm*—Cushman Darby & Cushman IP Group of Pillsbury Madison & Sutro LLP

[57] ABSTRACT

A hit expectation sound is emitted from a speaker in accordance with the kind of prize line on which a predetermined, prizewinning combination of symbols is expected to be arranged. The emitted hit expectation sound is transmitted to a player via sound transmitting holes provided in a lower portion of the machine. Based on the hit expectation sound being heard, the player can recognize on which of a plurality of prize lines the predetermined combination of symbols is expected to be arranged. The player can enjoy his favorite hit expectation sound by causing part of the predetermined combination of symbols to be stopped on the prize line that is associated with his favorite hit expectation sound.

17 Claims, 16 Drawing Sheets

Fig. 4

| CODE NO. | 1ST REEL | 2ND REEL | 3RD REEL |
|---|---|---|---|
| 0 | A | E | B |
| 1 | G | C | H |
| 2 | F | D | F |
| 3 | C | G | E |
| 4 | F | D | F |
| 5 | A | A | A |
| 6 | D | E | E |
| 7 | C | G | F |
| 8 | G | D | D |
| 9 | F | E | F |
| 10 | C | B | H |
| 11 | F | D | B |
| 12 | A | E | F |
| 13 | E | D | E |
| 14 | C | A | F |
| 15 | F | E | H |
| 16 | B | G | C |
| 17 | F | D | F |
| 18 | C | B | D |
| 19 | E | F | E |
| 20 | F | D | F |

Fig. 8

| CODE NO. OF 3RD REEL | PRIZE LINE | SYMBOL OF 1ST REEL | SYMBOL OF 2ND REEL | SYMBOL OF 3RD REEL | BIG HIT | MEDIUM HIT | SMALL HIT | NO HIT |
|---|---|---|---|---|---|---|---|---|
| 0 | | | | | | | | 1 |
| 1 | L2A | E | E | E | | 1 | | |
| 2 | | | | | | | | 1 |
| 3 | | | | | | | | 1 |
| 4 | | | | | | | | 1 |
| 5 | L1 | A | A | A | 1 | | | |
| 6 | | | | | | | | 1 |
| 7 | | | | | | | | 1 |
| 8 | | | | | | | | 1 |
| 9 | | | | | | | | 1 |
| 10 | L2A | E | E | B | | 1 | | |
| 11 | | | | | | | | 1 |
| 12 | L2A | E | E | E | | 1 | | |
| 13 | | | | | | | | 1 |
| 14 | | | | | | | | 1 |
| 15 | | | | | | | | 1 |
| 16 | | | | | | | | 1 |
| 17 | | | | | | | | 1 |
| 18 | L2A | E | E | E | | 1 | | |
| 19 | | | | | | | | 1 |
| 20 | L2A | E | E | B | | 1 | | |

GAME MACHINE WITH A HIT EXPECTATION SOUND EMITTING FUNCTION

BACKGROUND OF THE INVENTION

1. Field of the Invention

The present invention relates to a game machine in which various patterns are displayed on a variable display device in a variable manner and a hit occurs when a predetermined combination of patterns is stopped (displayed) on a prize line.

2. Description of the Related Art

For example, slot machines are known as game machines of the above kind. In a common slot machine, three reels are provided adjacent to each other in the rear of a front panel so as to assume three columns. Various patterns that are illustrated on the outer circumferential surface of each reel are seen through the associated window formed in the front panel. Five prize lines are drawn in the windows, and a slot machine game is performed in such a manner that a player tries to have a predetermined combination of patterns stopped on any of those prize lines.

Specifically, each reel starts to rotate upon manipulation of a start lever by a player, whereupon patterns are displayed in each window so as to move (rotate) in the column direction. When the rotation speed of the reels has reached a predetermined speed, stop switches that are provided for the respective reels are rendered manipulable. The player tries to stop desired patterns on any of the prize lines by stopping the rotation of each reel by manipulating the associated stop switch while watching patterns that are moving. The rotation of each reel is stopped in accordance with manipulation timing of the associated switch. If a predetermined combination of patterns is displayed on any of the prize lines when the reels have stopped, the player is given a prize corresponding to that combination of patterns.

However, in conventional game machines of the above type, although a player plays while paying attention to the kind of predetermined combination of patterns to be arranged on the prize lines, he does not pay much attention to the kind or number of prize lines on which a predetermined combination of patterns are to be arranged. Further, conventionally, attention is not paid to the kind of reel column whose patterns are to be stopped (displayed) last on the prize lines, either.

SUMMARY OF THE INVENTION

An object of the present invention is to impart a wider interest to a game by directing a player's attention and interest to the kind of prize lines themselves, the number of prize lines, and the kind of reel column to which attention has not been paid conventionally.

Another object of the invention is to improve the ease of operation of a game machine.

The invention provides a game machine comprising a variable display device for displaying various patterns in a variable manner; a plurality of prize lines each for defining a combination of patterns displayed on the variable display device, a hit occurring when a predetermined combination of patterns is stopped and displayed on the prize lines; and hit expectation sound generating means for generating, when part of the predetermined combination of patterns are stopped and displayed on any of the prize lines is satisfied, a hit expectation sound in accordance with a kind of a prize line for which the condition is satisfied.

In this configuration, on condition that part of a predetermined combination of patterns are stopped and displayed on any of the prize lines, that is, a predetermined combination of patterns is expected to be arranged on any of the prize lines, a hit expectation sound is generated in accordance with the kind of a prize line for which the condition is satisfied. Based on a hit expectation sound, a player can distinguish, from the plurality of prize lines, a prize line for which a predetermined combination of patterns is expected to be arranged. Further, by causing a predetermined combination of patterns to be stopped (displayed) on a prize line that is associated with his favorite hit expectation sound, the player can hear that hit expectation sound, whereby the game becomes more enjoyable to him.

According to another aspect of the invention, there is provided hit expectation sound generating means for generating a hit expectation sound in accordance with a kind of a remaining column that continues to perform variable display, when part of the predetermined combination of patterns are stopped and displayed on any of the prize lines.

In this configuration, the hit expectation sound generating means generates a hit expectation sound in accordance with the kind of a variable display column whose patterns are to be stopped last on the prize lines. By causing the last pattern of a predetermined combination of patterns to be stopped (displayed) in a variable display column that is associated with his favorite hit expectation sound, the player can hear that hit expectation sound, whereby the game becomes more enjoyable to him.

According to a further aspect of the invention, there is provided hit expectation sound generating means for generating, when part of the predetermined combination of patterns are stopped and displayed on any of the prize lines, a hit expectation sound in accordance with the number of prize lines for which the condition is satisfied.

In this configuration, the hit expectation sound generating means generates a hit expectation sound in accordance with the number of prize lines for which a predetermined combinations of symbols is expected to be arranged. Based on a hit expectation sound, a player can recognize the number of prize lines on which a predetermined combination of patterns is expected to be arranged. The player can also recognize the degree of possibility of occurrence of a hit based on the thus-recognized number of prize lines, and hence can perform a game manipulation in accordance with the degree of possibility of occurrence of a hit.

That is, according to the invention, a player's attention and interest can be directed to the kind of prize lines themselves, the number of prize lines, and the kind of reel column to which attention has not been paid conventionally, and a wider interest can thereby be imparted to a game. Further, the ease of operation of the game machine can be improved.

BRIEF DESCRIPTION OF THE DRAWINGS

FIG. 4 conceptually shows a symbol table that is used in a game process of the slot machine of FIG. 1;

FIG. 8 shows an example of a hit flag generation table that is used in the game process of the slot machine according to the first embodiment;

DETAILED DESCRIPTION OF THE PREFERRED EMBODIMENTS

The preferred embodiments of the present invention will be explained in reference to the attached drawings.

A slot machine as a game machine according to a first embodiment of the present invention will be hereinafter described.

Figure 1:
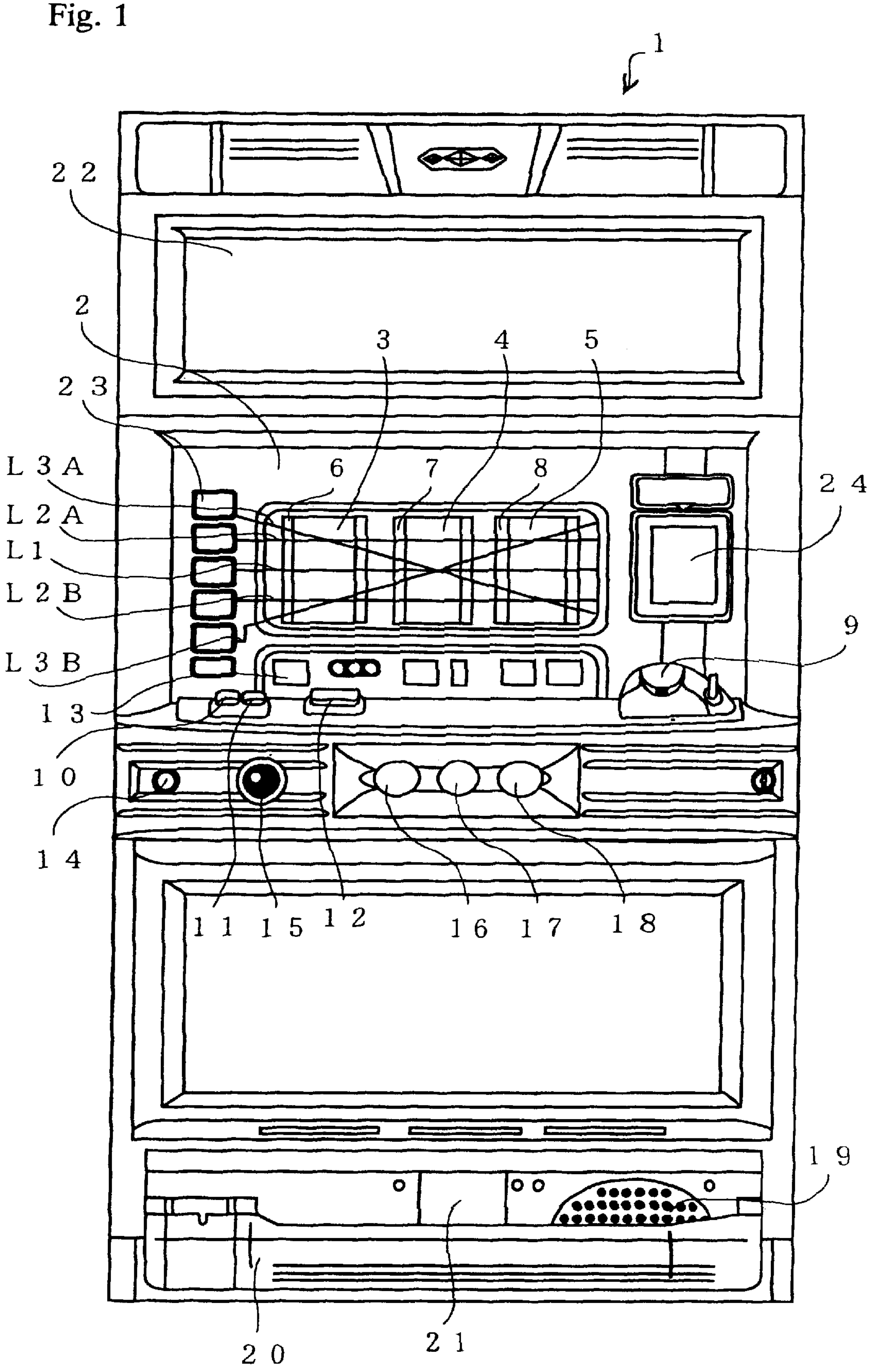
FIG. 1 is a front view showing an appearance of a slot machine according to each embodiment of the present invention.

FIG. 1 is a front view of a slot machine 1 according to the first embodiment.

Three reels 3–5 constituting a variable display device are rotatably provided in the rear of a front panel 2 of the slot machine 1. A symbol columns consisting of plural kinds of patterns (hereinafter referred to as symbols) is illustrated on the outer circumferential surface of each of the reels 3–5. Three of those symbols are seen through each of display windows 6–8 that are formed on the front side of the slot machine 1. An inlet 9 for a player to insert a medal as a game medium is provided on the bottom-right side of the display windows 6–8.

Figure 2A:
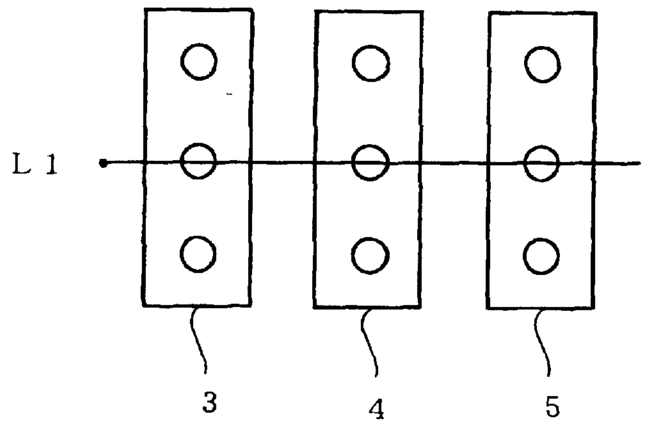
FIGS. 2A–2C show how prize lines drawn in display windows of the slot machine of FIG. 1 are rendered effective sequentially.
Figure 2B:
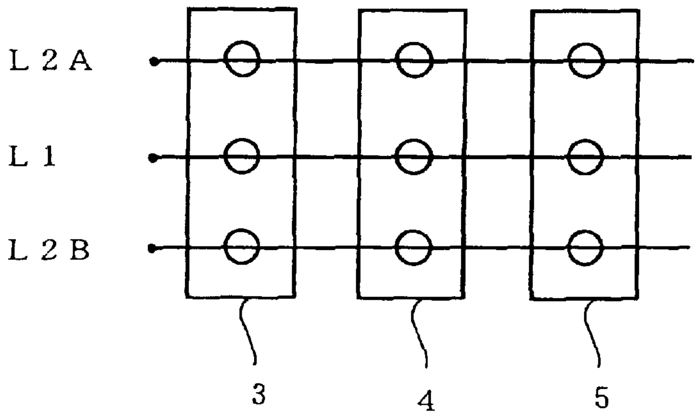

Three horizontal prize lines (a central line L1, a top line L2A, and a bottom line L2B) and two diagonal prize lines (a negative slope line L3A and a positive slope line L3B) are drawn in the display windows 6–8. Prior to the start of a game, when a player inserts one medal through the medal inlet 9, only the central prize line L1 over the reels 3–5 is rendered effective as shown in FIG. 2A. When he inserts two medals through the inlet 9, the top and bottom prize lines L2A and L2B are additionally rendered effective; that is, the three horizontal lines L1, L2A, and L2B are rendered effective as shown in FIG. 2B. When he inserts three medals through the inlet 9, all the prize lines L1, L2A, L2B, L3A and L3B are rendered effective as shown in FIG. 2C.

Figure 2C:
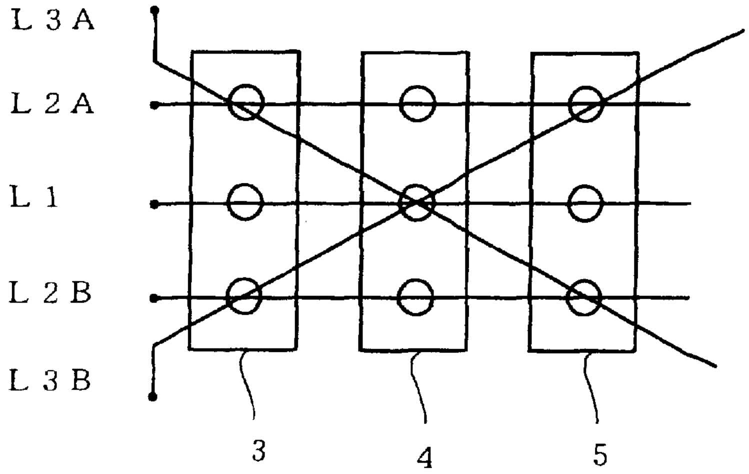

In FIGS. 2A–2C, circles represent symbols illustrated on the reels 3–5. Prize lines that have been rendered effective are indicated to a player by turning-on of associated ones of effective line indication lamps 23 (see FIG. 1) that are provided at the ends of the respective prize lines.

A 1-bet switch 10, a 2-bet switch 11, and a max-bet switch 12 are provided on the bottom-left side of the display windows 6–8. Where the number of credited medals is shown in a credit number display section 13, one, two, and three credited medals, instead of inserting medals through the inlet 9, are betted in one game when the 1-bet switch 10, the 2-bet switch 11, and the max-bet switch 12 have been depressed, respectively. The credit number display section 13, which is formed by 7-segment LED members of a number that is equal to the number of digits of numerical values to be displayed, indicates the number of medals currently credited.

A credit/payment changeover switch (C/P switch) 14 and a start lever 15 are provided under the bet switches 10–12. Stop buttons 16–18 are provided in a center portion of the machine on the right of the start lever 15. Medal credit/payment switching can be made by depressing the C/P switch 14.

The reels 3–5 start to rotate at the same time upon manipulation of the start lever 15. The stop buttons 16–18, which are provided so as to correspond to the respective reels 3–4, are made manipulable when the rotation speed of the reels 3–5 has reached a predetermined speed. The rotation of each reel is stopped when the associated stop button is depressed by a player.

Sound transmitting holes 19 and a medal tray 20 are provided in a front, lower portion of the slot machine 1. The sound transmitting holes 19 output sounds that are emitted from a speaker that is accommodated in the machine. The medal tray 20 store medals that are paid out through a medal payment outlet 21. An allotment display section 22 for indicating the number of medals to be paid for each prize is provided in a front, upper portion of the slot machine 1.

A liquid crystal display section 24, which is a display device for simulating the rotation of the reels 3–5, is provided in the front panel 2 on the right of the reels 3–5.

Figure 3:
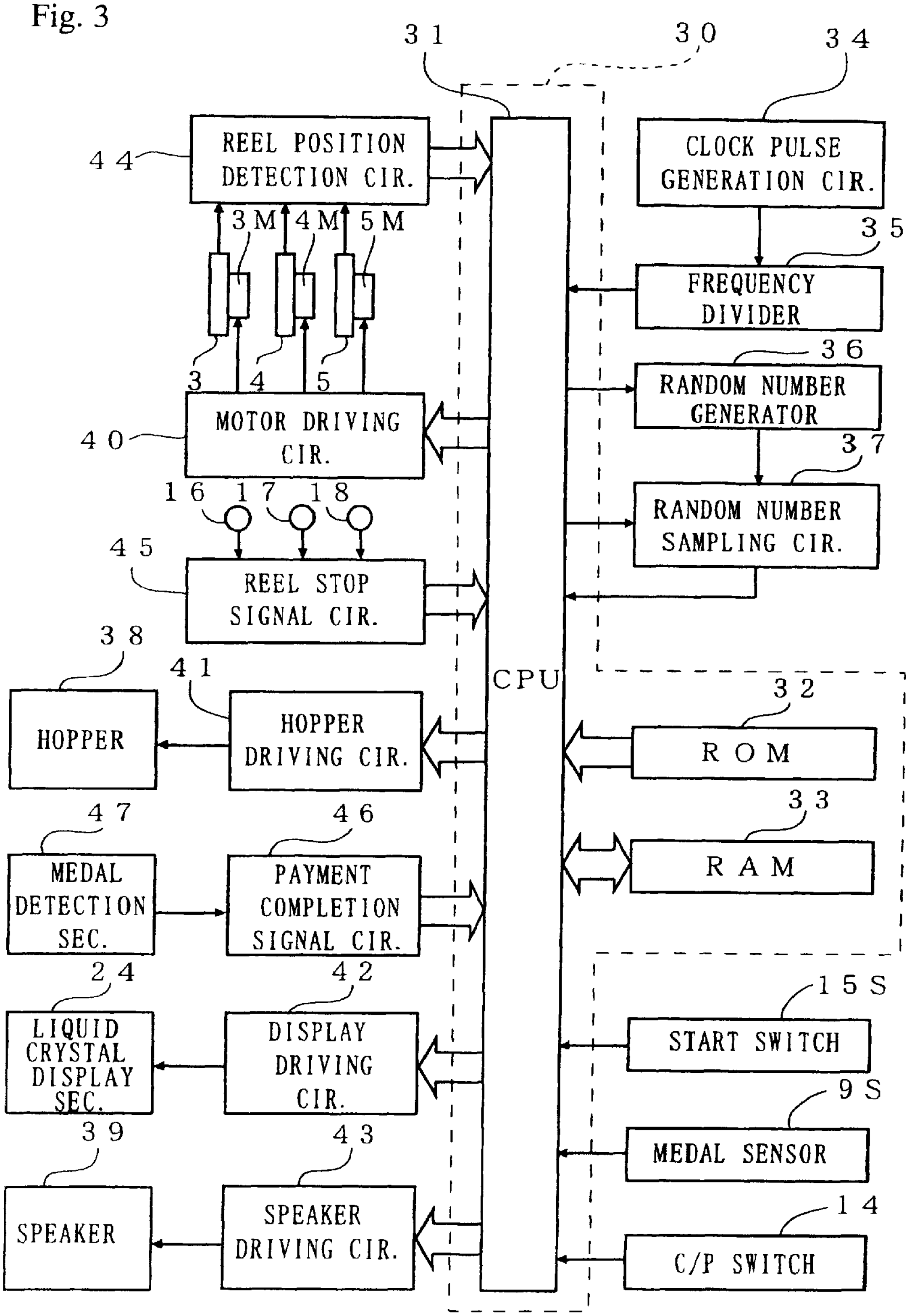
FIG. 3 is a block diagram showing the main control circuit configuration of the slot machine of FIG. 1.

FIG. 3 shows a circuit configuration including a control section for controlling the game processing of the slot machine 1 of this embodiment and peripheral devices (actuators) electrically connected to the control section.

The control section is composed of a microcomputer 30 as the main component and circuits for random number sampling. The microcomputer 30 includes a CPU 31 that performs a control operation according to a preset program and a ROM 32 and a RAM 33 as storing means. A clock pulse generation circuit 34 for generating reference clock pulses, a frequency divider 35, a random number generator 36 for generating random numbers in a predetermined range, and a random number sampling circuit 37 for sampling one of the generated random numbers are connected to the CPU 31.

Stepping motors 3M–5M for rotating the respective reels 3–5, a hopper 38 for accommodating medals, the above-mentioned liquid crystal display section 24, and a speaker 39 are the main actuators whose operations are controlled by control signals sent from the microcomputer 30. The stepping motors 3M–5M, the hopper 38, the liquid crystal display section 24, and the speaker 39 are driven by a motor driving circuit 40, a hopper driving circuit 41, a display driving circuit 42, and a speaker driving circuit 43, respectively. The driving circuits 40–43 are connected to the CPU 31 via I/O ports of the microcomputer 30. Each of the stepping motors 3M–5M is excited (1–2 phases) by the motor driving circuit 40, and makes one rotation when supplied with a drive signal of 400 pulses.

A start switch 15S for detecting a manipulation on the start lever 15, an inserted medal sensor 9S for detecting a medal that has been inserted through the medal inlet 9, and the above-mentioned C/P switch 14 are the main input signal generating means for generating input signals that are necessary for the microcomputer 30 to generate control signals. A reel position detection circuit 44 for detecting rotation positions of the respective reels 3–5 based on output pulse signals that are supplied from respective reel rotation sensors (not shown) is also provided. In FIG. 3, the reel rotation sensors and the reel position detection circuit 44 are included in the driving mechanisms of the respective reels 3–5.

Each reel rotation sensor generates a reset pulse per one rotation of the associated one of the reels 3–5. The reset pulse is supplied to the CPU 31 via the reel position detection circuit 44. Count values corresponding to rotation positions, within one rotation, of the respective reels 3–5 are stored in the RAM 33. Upon reception of a reset pulse, the CPU 31 clears the corresponding count value stored in the RAM 33 to "0." The clearing operation cancels, for each single rotation, a deviation between the movement display of each symbol and the rotation of each of the stepping motors 3M–5M.

A reel stop signal circuit 45 and a payment completion signal generation circuit 46 are other input signal generating means. The reel stop signal circuit 45 generates signals for stopping the reels 3–5 when the respective stop buttons 16–18 have been depressed. The medal detection section 47 counts the number of medals that are paid out from the hopper 38. The payment completion signal generation circuit 46 outputs, to the CPU 31, a signal indicating completion of medal payment when the count value of medals actually paid out that is received from the medal detection section 47 has reached a prescribed number that is indicated by allotted number data.

The ROM 32 stores, as a sequence program, a procedure of a game process that is executed by the slot machine 1, as well as, in a sectioned manner, a prize determination table, a symbol table, a prizewinning symbol combination table, etc.

The prize determination table includes data for sectioning random numbers that are generated in a predetermined range by the random number generator 36 into groups of prize modes. A group to which one random number that has been sampled by the sampling circuit 37 belongs is judged and a prize mode is thereby determined.

FIG. 4 conceptually shows the symbol table, which correlates the rotation positions of the respective reels 3–5 and symbols and represents symbol columns in the form of codes. In the symbol table, each code number is correlated with symbol codes of the respective reels 3–5. The code numbers are sequentially given to the respective rotation positions of each of the reels 3–5 that are arranged at a constant pitch, with the rotation position where to generate a reset pulse employed as a reference. The symbol codes represent symbols that are provided so as to correspond to the respective code numbers.

The prizewinning symbol combination table includes symbol codes of prizewinning symbol combinations that are to be shown in the allotment display section 22, symbol codes of a symbol combination of a "reach spot" that indicates to a player that a flag of occurrence of a particular game has been set, prize determination codes representing respective prizes, the number of medals to be allotted to each prize, etc. The prizewinning symbol combination table is referred to during stop controls for the first reel 3, the second reel 4, and the third reel 5 and in checking hits after all the reels 3–5 have been stopped.

Next, the operation (game process) of the slot machine 1 that is controlled by the microcomputer 30 in this embodiment will be described.

Figure 5:
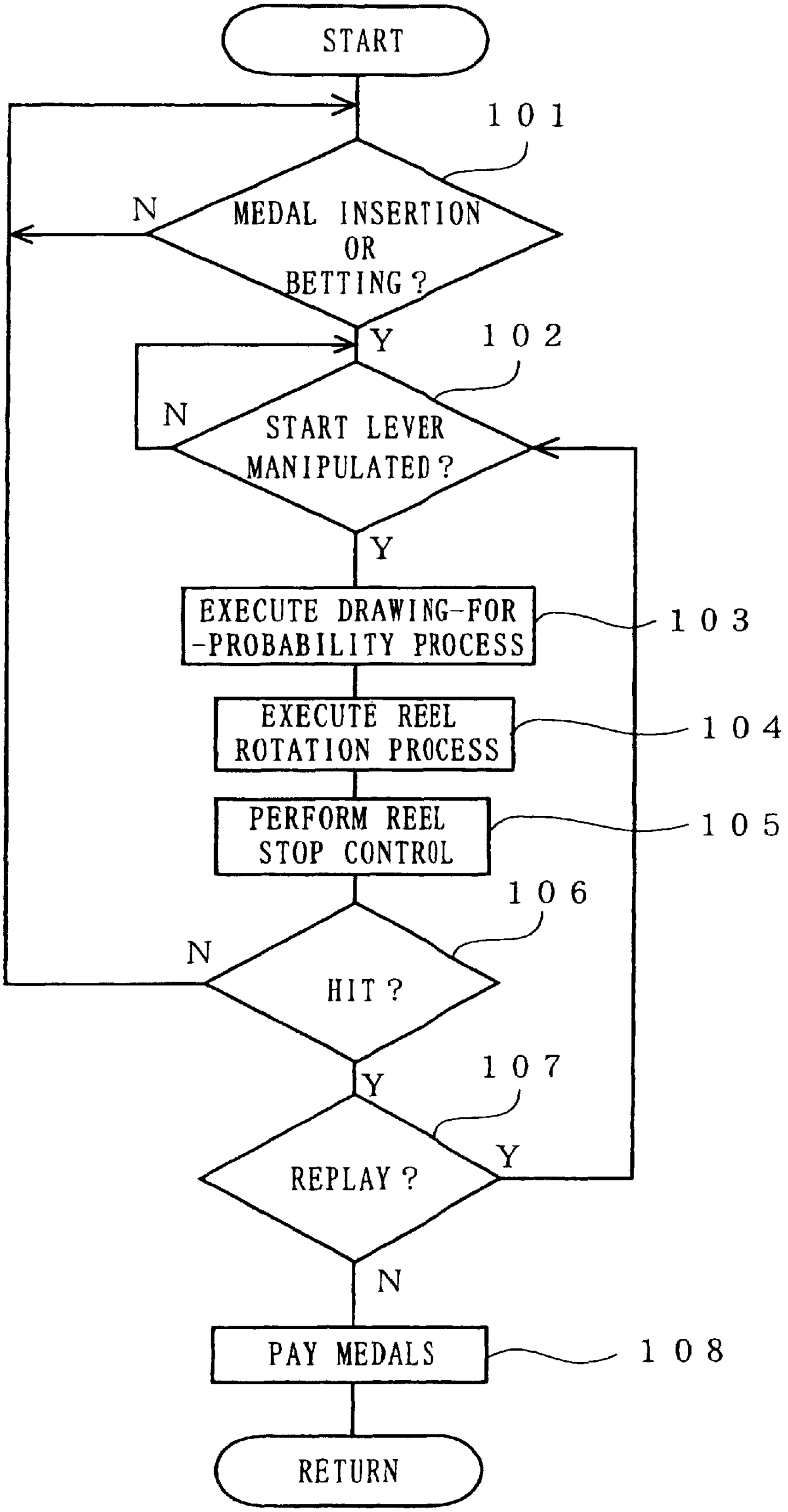
FIG. 5 is a flowchart outlining the game process of the slot machine of FIG. 1.

FIG. 5 is a flowchart outlining the game process.

First, the CPU 31 judges whether medal betting has been made (step 101). The judgment result becomes "yes" when a medal has been inserted through the medal inlet 9 and a detection signal has been input from the medal sensor 9S, or when a signal has been input from any of the bet switches 10–12. In this case, it is then judged whether a start signal has been input from the start switch 15S in response to manipulation of the start lever 15 (step 102).

If the judgment result at step 102 is "yes," the CPU 31 performs prize determination (drawing-for-probability process) (step 103) and thereafter executes a process of rotating the reels 3–5 (step 104). In the prize determination, which is performed at a proper time point after the manipulation of the start lever 15, it is judged to which of the prize groups of the prize determination table one random number sampled by the sampling circuit 37 from random numbers generated by the random number generator 36 belongs.

A stop control on the reels 3–5 is performed in accordance with the kind of prize flag that has been set as a result of the prize determination (step 105). Then, it is judged by referring to the prizewinning symbol combination table whether symbols that are displayed when the reels 3–5 have been stopped correspond to a predetermined prizewinning symbol combination (step 106). If no hit occurs, the judgment result becomes "no" and the process returns to step 101. If the judgment result is "yes," then it is judged whether the hit is "replay game" (step 107). If the judgment result at step 107 is "yes," the process returns to step 102, which is a step for waiting for a manipulation on the start lever 15. If the hit is not "replay game," a predetermined number of medals are paid out from the hopper 38 (step 108).

Next, the reel stop control of the above-mentioned step 105 will be described with reference to flowcharts of FIGS. 6 and 7.

Figure 6:
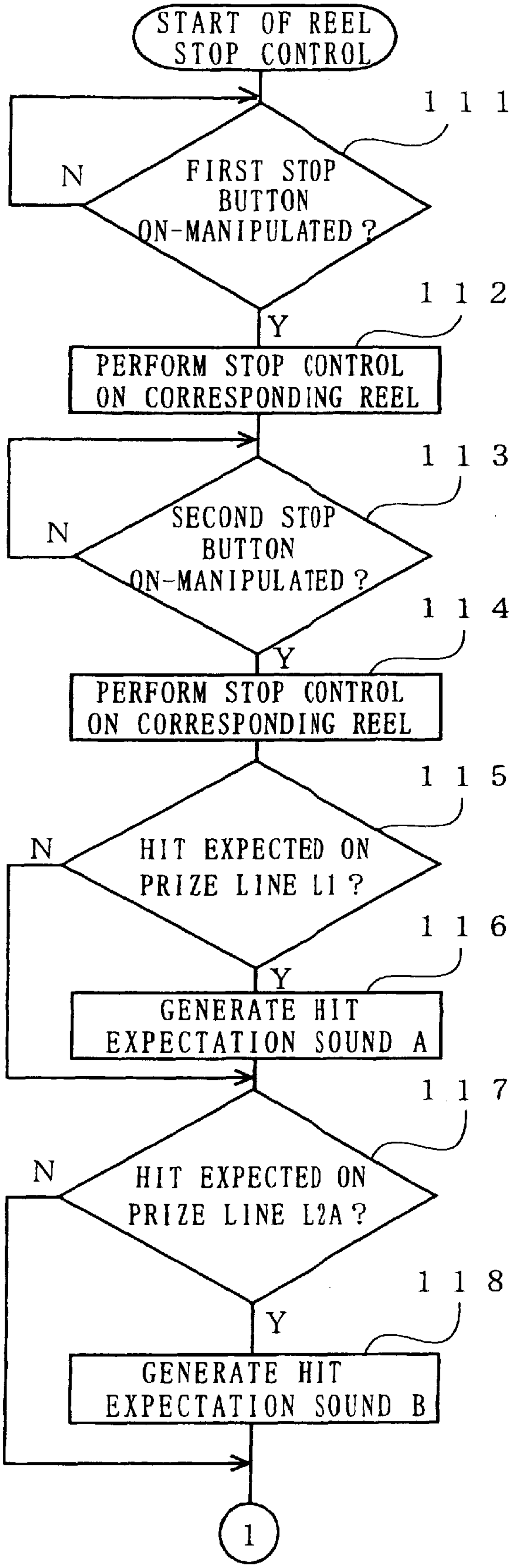
FIG. 6 is a first flowchart showing a reel stop control process in the slot machine according to a first embodiment of the invention.

As described above, manipulations on the respective stop buttons 16–18 by a player are detected by the CPU 31 via the reel stop signal circuit 45 (step 111 in FIG. 6). When an on-manipulation on one of the three stop buttons 16–18, that is, a first stop button, has been detected, a stop control is performed on one of the reels 3–5 corresponding to the manipulated stop button (step 112).

In the stop control, the CPU 31 controls the motor driving circuit 40 so that the supply of drive pulses to one of the stepping motors 3M–5M corresponding to the manipulated stop button stopps. At this time, symbols to be stopped (displayed) in one of the windows 6–8 by the stop-manipulated reel can be known from the number of drive pulses that have been supplied to the one of the stepping motors 3M–5M based on the symbol table. The stopped symbols are temporarily stored, as symbol codes, in a predetermined area of the RAM 33.

Subsequently, it is judged whether a second stop button has been on-manipulated (step 113). If the judgment result is "yes," the CPU 31 performs a stop control on the reel corresponding to the manipulated stop button as in the above case (step 114). Symbols that are stopped (displayed) in one of the windows 6–8 by the second stop-manipulated reel are also temporarily stored, as a symbol code, in a predetermined area of the RAM 33 as in the above case.

When two of the three reels 3–5 have been stopped and the symbol codes of the symbols displayed by the stopped reels have been stored in the predetermined areas of the RAM 33 in the above manner, the CPU 31 generates a hit flag generation table. That is, a table indicating what hit will occur on what prize line when the already fixed symbols of the two stopped reels are combined with what symbol of the one remaining reel is stored in a predetermined area of the RAM 33. To this end, whether a hit will occur is judged for each effective prize line by checking combinations of the already determined symbols of the two stopped reels and every symbol to be displayed by the remaining reel.

FIG. 8 shows an example of the hit flag generation table that is generated in the above manner. This example is directed to a case where the first reel 3 and the second reel 4 have already been stopped and a stop control is to be performed on the third reel 5. Symbols that are displayed by the stopped first and second reels 3 and 4 are shown on the table as symbol codes and constitute part of a prizewinning symbol combination for each of the effective prize lines L1 and L2A. These symbol codes are combined with a symbol code of a symbol that is displayed by the remaining third reel 5 on each of the prize lines L1 and L2A, and whether a hit will occur is judged for each prize line.

A judgment result is indicated by a hit flag that is set for a symbol combination that causes a hit. The hit mode such as a big hit, a medium hit, a small hit, or no hit is represented by the kind of hit flag. Once the hit flag generation table has been generated, it can be known in advance what kind of hit will occur on an effective prize line when what symbol is displayed by the remaining one reel stopped.

Returning to FIG. 6, it is then judged by referring to the hit flag generation table whether it is expected that a hit will occur on the effective prize line L1 (step 115 in FIG. 6). If there is such a possibility, the CPU 31 controls the speaker driving circuit 43 so that the speaker 39 emits a hit expectation sound A (step 116). The hit expectation sound A is transmitted to the player via the sound transmitting holes 19. The speaker driving circuit 43, the speaker 39, and the CPU 31 constitute a hit expectation sound generating means.

Figure 9A:
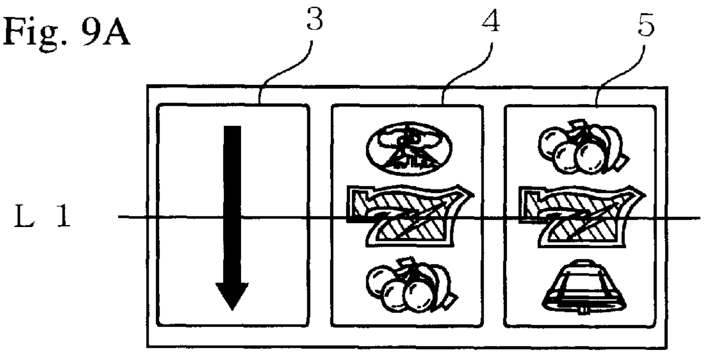
FIGS. 9A–9E are front views of a variable display device showing examples of prize lines for which a hit expectation sound is generated in the slot machine according to the first embodiment.

For example, the hit expectation sound A is generated when symbols "7" are displayed on the effective prize line L1 by the stopped second and third reels 4 and 5 and the first reel 3 is rotating as shown in FIG. 9A.

If it is not expected that a hit will occur on the prize line L1, then it is judged based on the hit flag generation table whether it is expected that a hit will occur on the effective prize line L2A (step 117). If there is such a possibility, the CPU 31 controls the speaker driving circuit 43 so that the speaker 39 emits a hit expectation sound B, which is different from the hit expectation sound A (step 118). The hit expectation sound B is transmitted to the player also via the sound transmitting holes 19.

Figure 9B:
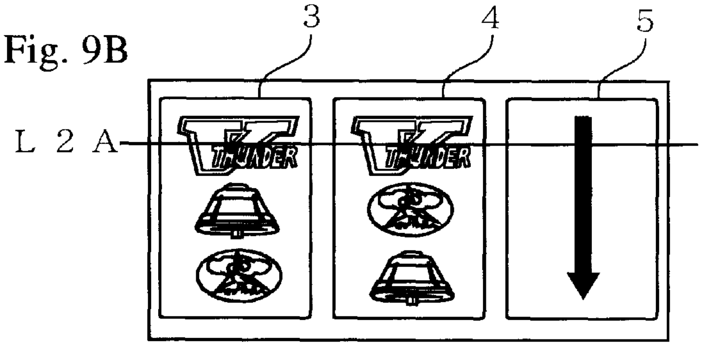

For example, the hit expectation sound B is generated when symbols "THUNDER V" are displayed on the effective prize line L2A by the stopped first and second reels 3 and 4 and the third reel 5 is rotating as shown in FIG. 9B.

Figure 7:
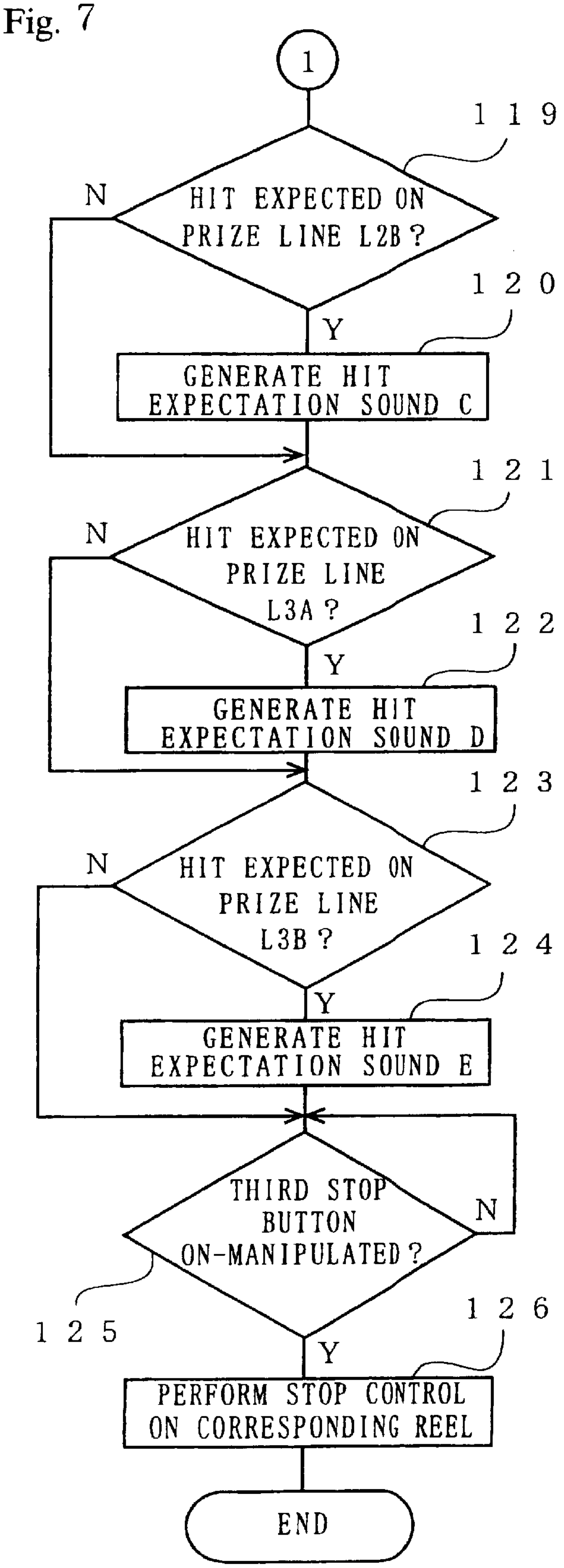
FIG. 7 is a second flowchart showing the reel stop control process in the slot machine according to the first embodiment.

If it is not expected that a hit will occur on the prize line L2A, then it is judged based on the hit flag generation table whether it is expected that a hit will occur on the effective prize line L2B (step 119 in FIG. 7). If there is such a possibility, the CPU 31 controls the speaker driving circuit 43 so that the speaker 39 emits a hit expectation sound C, which is different from the hit expectation sounds A and B (step 120). The hit expectation sound C is transmitted to the player also via the sound transmitting holes 19.

Figure 9C:
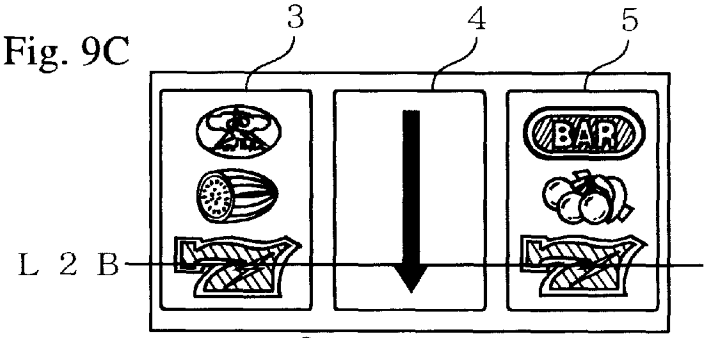

For example, the hit expectation sound C is generated when symbols "7" are displayed on the effective prize line L2B by the stopped first and third reels 3 and 5 and the second reel 4 is rotating as shown in FIG. 9C.

If it is not expected that a hit will occur on the prize line L2B, then it is judged based on the hit flag generation table whether it is expected that a hit will occur on the effective prize line L3A (step 121). If there is such a possibility, the CPU 31 controls the speaker driving circuit 43 so that the speaker 39 emits a hit expectation sound D, which is different from the hit expectation sounds A, B and C (step 122). The hit expectation sound D is transmitted to the player also via the sound transmitting holes 19.

Figure 9D:
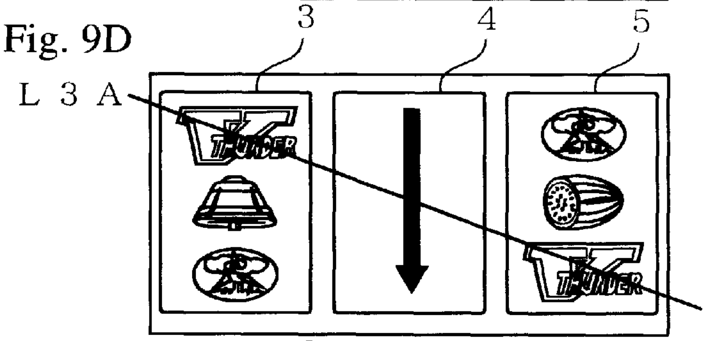

For example, the hit expectation sound D is generated when symbols "THUNDER V" are displayed on the effective prize line L3A by the stopped first and third reels 3 and 5 and the second reel 4 is rotating as shown in FIG. 9D.

If it is not expected that a hit will occur on the prize line L3A, then it is judged based on the hit flag generation table whether it is expected that a hit will occur on the effective prize line L3B (step 123). If there is such a possibility, the CPU 31 controls the speaker driving circuit 43 so that the speaker 39 emits a hit expectation sound E, which is different from the hit expectation sounds A, B, C, and D (step 124). The hit expectation sound E is transmitted to the player also via the sound transmitting holes 19.

Figure 9E:
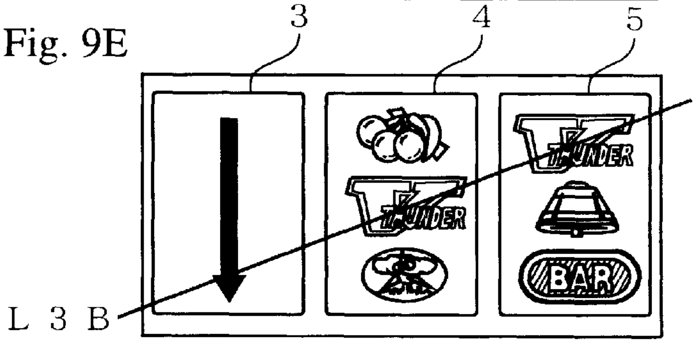

For example, the hit expectation sound E is generated when symbols "THUNDER V" are displayed on the effective prize line L3B by the stopped second and third reels 4 and 5 and the first reel 3 is rotating as shown in FIG. 9E.

Then, it is judged whether the stop button corresponding to the remaining one of the reels 3–5 has been manipulated (step 125). When an on-manipulation on the third stop button has been detected, the CPU 31 performs a stop control on the reel corresponding to the third stop button (step 126). Symbols that are displayed in one of the windows 6–8 by the finally stop-manipulated reel are also temporarily stored as symbol codes in a predetermined area of the RAM 33.

As a result, all the nine symbols that are displayed in the windows 6–8 are temporarily stored as symbol codes in the predetermined areas of the RAM 33. In the above-described hit judgment process (step 106 in FIG. 5), whether a hit has occurred is judged for each effective prize line by referring to those stored data.

The above embodiment has been described with an assumption that all the prize lines are rendered effective. If there is a non-effective prize line, the hit expectation judgment for that prize line is skipped.

In the first embodiment described above, part of the hit expectation sounds A–E are emitted from the speaker 39 in accordance with the kinds of prize lines on which a predetermined, prizewinning combination of symbols is expected to be arranged. Based on the part of the hit expectation sounds A–E, a player can distinguish part of the prize lines L1, L2A, L2B, L3A, and L3B on which a predetermined combination of symbols is expected to be arranged. Thus, he can quickly recognize a game state, that is, on which prize lines a hit is expected. Therefore, the ease of operation of the slot machine 1 is improved.

By causing a predetermined combination of symbols to be stopped (displayed) on a prize line that is associated with a player's favorite one of the hit expectation sounds A–E, he can enjoy his favorite hit expectation sound.

Next, a slot machine 1 as a game machine according to a second embodiment of the invention will be described.

Figure 10:
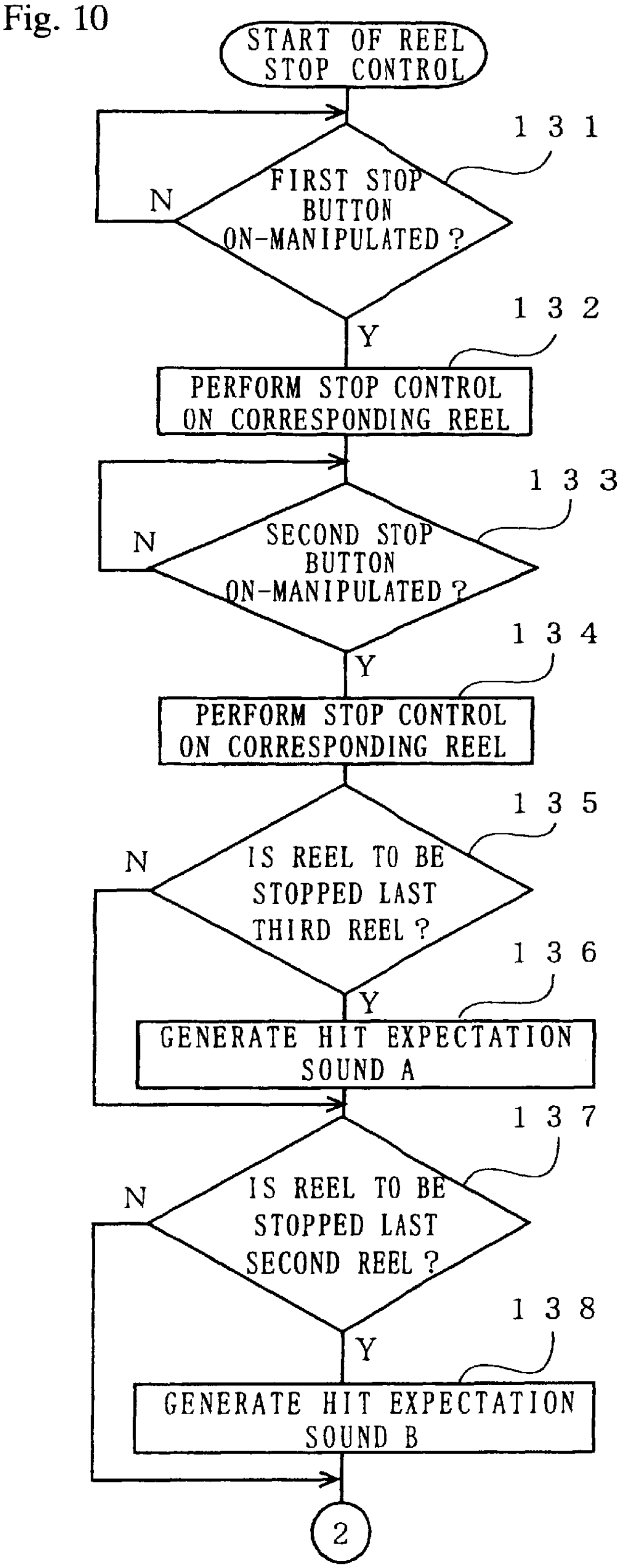
FIG. 10 is a first flowchart showing a reel stop control process in the slot machine according to a second embodiment of the invention.
Figure 11:
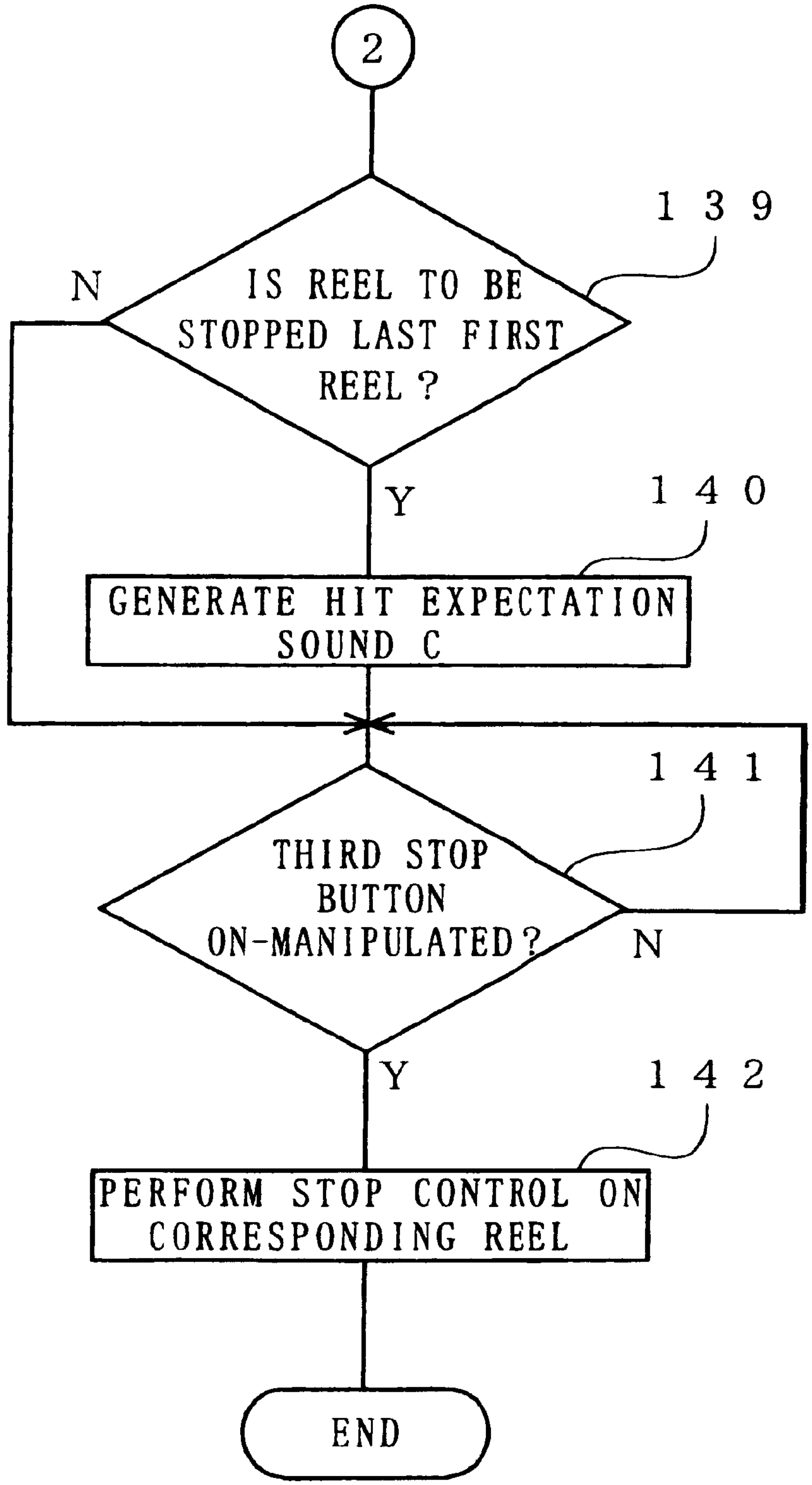
FIG. 11 is a second flowchart showing the reel stop control process in the slot machine according to the second embodiment.

This embodiment is different from the first embodiment only in the reel stop control process (step 105 in FIG. 5). FIGS. 10 and 11 are flowcharts showing a stop control process for the reels 3–5 according to this embodiment.

Steps 131–134 of this embodiment are the same as the above-described steps 111–114. That is, first it is judged whether a first stop button has been on-manipulated (step 131 in FIG. 10). If the judgment result is "yes," a stop control is performed on one of the reels 3–5 corresponding to the on-manipulated button (step 132). Subsequently, it is judged whether a second stop button has been on-manipulated (step 133). If the judgment result is "yes," a stop control is performed on one of the reels 3–5 corresponding to the on-manipulated button (step 134).

When any two reels have been stopped, a hit flag generation table like the one described above is generated and it is checked what kinds of hits may occur on what prize lines. If it is found that it is expected that a hit may occur on a certain prize line, then it is judged whether the last reel on which no stop manipulation has been performed is the third reel (right-hand reel) 5 (step 135).

If the judgment result is "yes," the CPU 31 controls the speaker driving circuit 43 so that speaker 39 emits a hit expectation sound A (step 136).

Figure 12A:
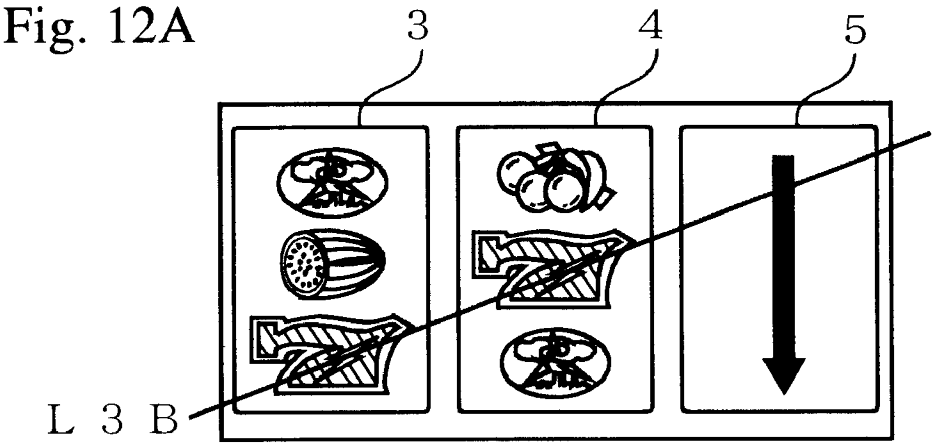
FIGS. 12A–12C are front views of the variable display device showing examples of reels for which a hit expectation sound is generated in the slot machine according to the second embodiment.

For example, the hit expectation sound A is generated when symbols "7" of the first reel 3 and the second reel 4 are arranged on the prize line L3B (which means that a hit is expected) and the last reel on which no stop manipulation has been performed is the third reel 5 as shown in FIG. 12A.

If the last reel is not the third reel 5, then it is judged whether the last reel is the second reel 4 (step 137). If the judgment result is "yes," the CPU 31 controls the speaker driving circuit 43 so that speaker 39 emits a hit expectation sound B, which is different from the hit expectation sound A (step 138).

Figure 12B:
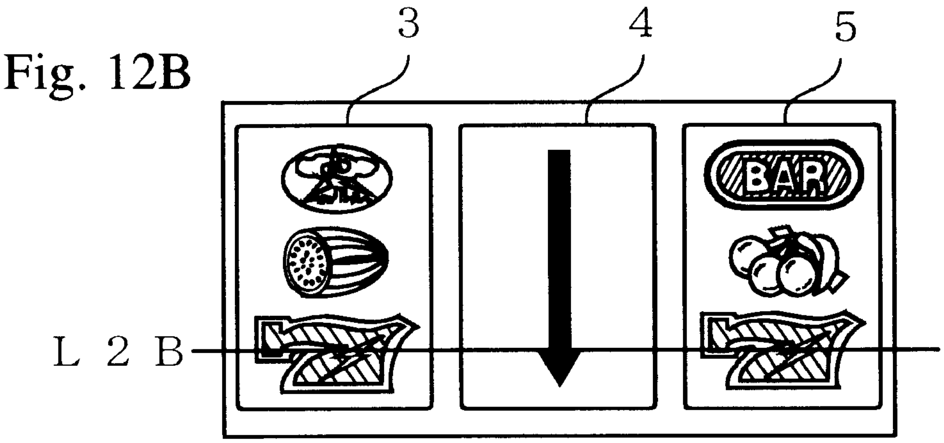

For example, the hit expectation sound B is generated when symbols "7" of the first reel 3 and the third reel 5 are arranged on the prize line L2B (which means that a hit is expected) and the last reel on which no stop manipulation has been performed is the second reel 4 as shown in FIG. 12B.

If the last reel is not the second reel 4, then it is judged whether the last reel is the first reel 3 (step 139 in FIG. 11). If the judgment result is "yes," the CPU 31 controls the speaker driving circuit 43 so that speaker 39 emits a hit expectation sound C, which is different from the hit expectation sounds A and B (step 140).

Figure 12C:
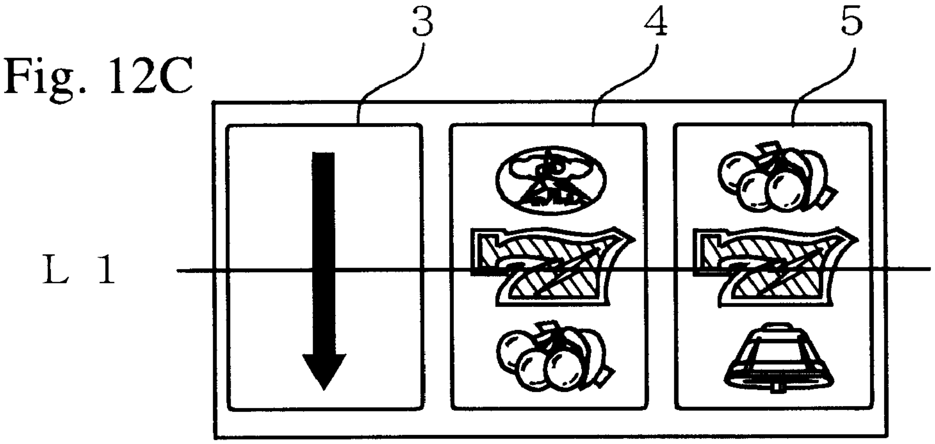

For example, the hit expectation sound C is generated when symbols "7" of the second reel 4 and the third reel 5 are arranged on the prize line L1 (which means that a hit is expected) and the last reel on which no stop manipulation has been performed is the first reel 3 as shown in FIG. 12C.

Then, it is judged whether an on-manipulation has been performed on the third stop button for the last one of the reels 3–5 (step 141). If the judgment result is "yes," the CPU 31 performs a stop control on the last reel corresponding to third stop button (step 142). Thereafter, the above-described hit judgment process (step 106 in FIG. 5) is executed, whereby whether a hit has occurred is judged for each of the effective prize lines.

In the second embodiment described above, the hit expectation sounds A–C are emitted from the speaker 39 in accordance with the kind of reel whose symbols are to be stopped (displayed) on the prize lines as the last symbols. By performing manipulations so that symbols of a reel that is associated with his favorite one of the hit expectation sounds A–C will be stopped (displayed) as the last symbols, he can enjoy his favorite hit expectation sound.

Next, a slot machine 1 as a game machine according to a third embodiment of the invention will be described.

Figure 13:
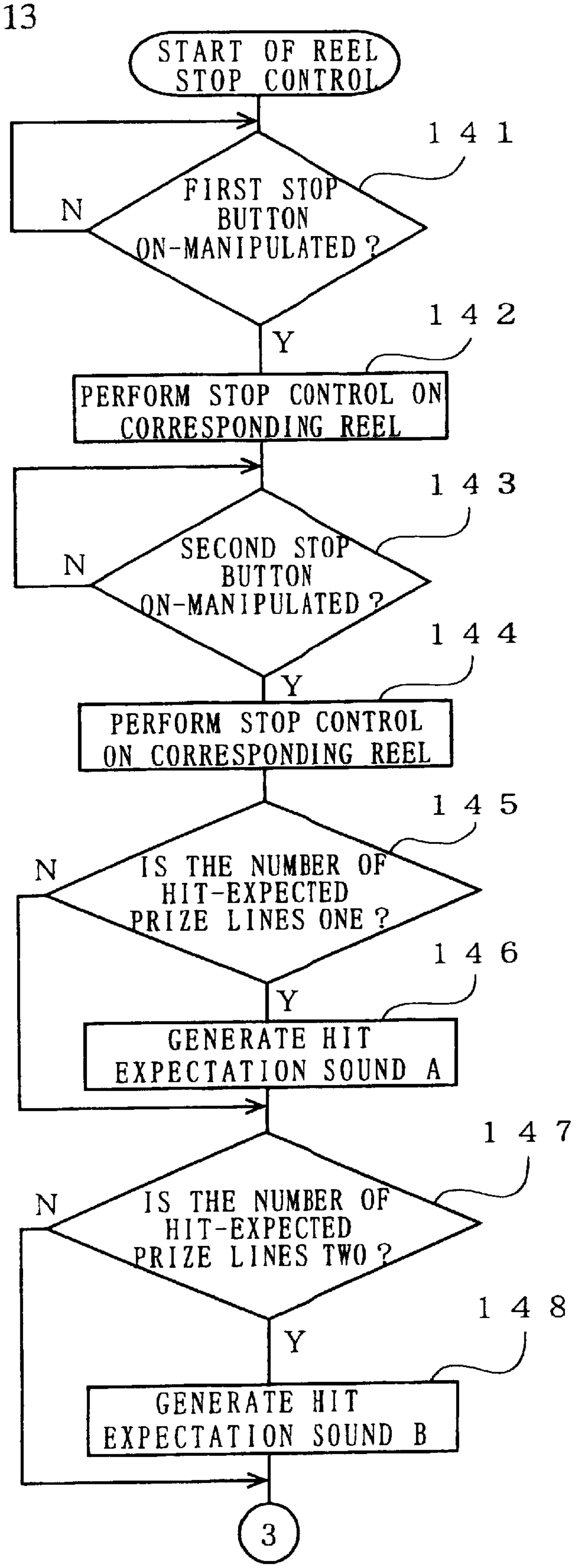
FIG. 13 is a first flowchart showing a reel stop control process in the slot machine according to a third embodiment of the invention.
Figure 14:
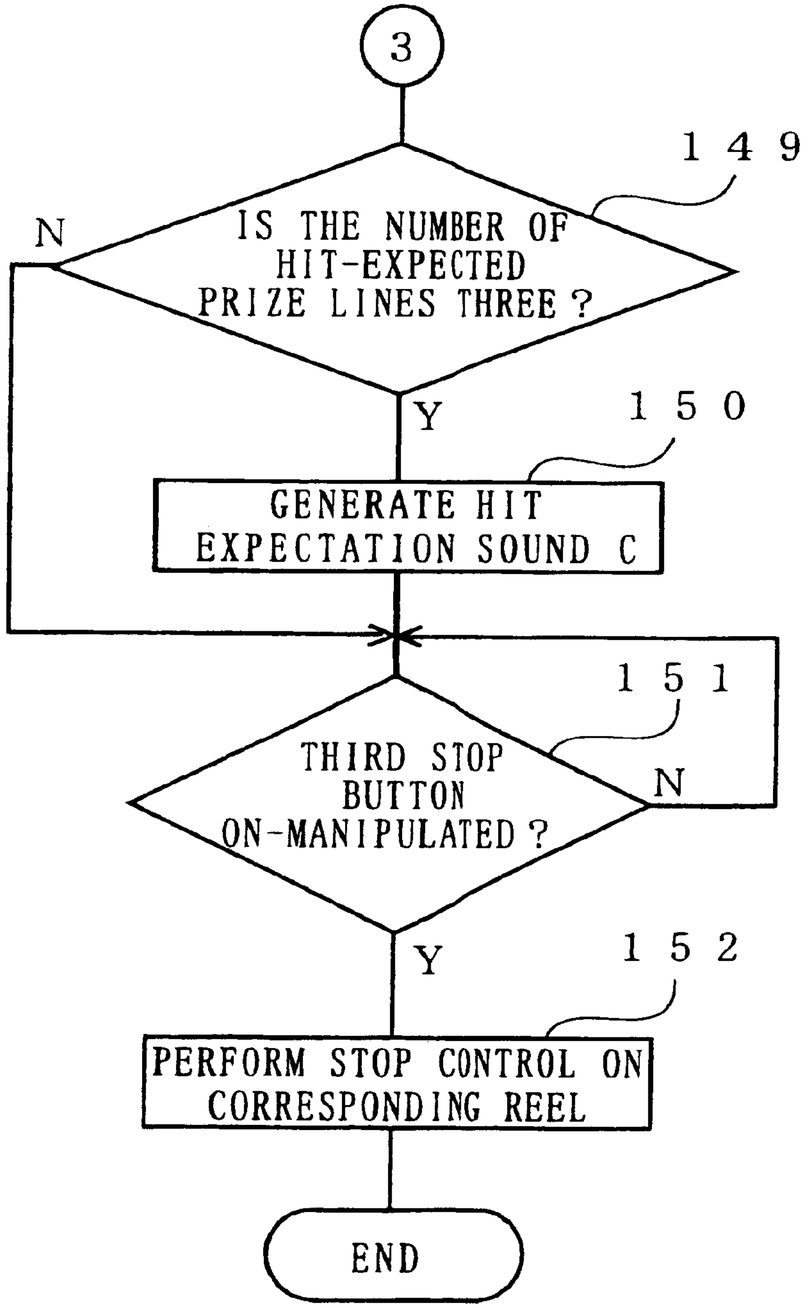
FIG. 14 is a second flowchart showing the reel stop control process in the slot machine according to the third embodiment.

Like the second embodiment, this embodiment is different from the first embodiment only in the reel stop control process (step 105 in FIG. 5). FIGS. 13 and 14 are flowcharts showing a stop control process for the reels 3–5 according to this embodiment.

Steps 141–144 of this embodiment are the same as the above-described steps 111–114. That is, first it is judged whether a first stop button has been on-manipulated (step 141 in FIG. 13). If the judgment result is "yes," a stop control is performed on one of the reels 3–5 corresponding to the on-manipulated button (step 142). Subsequently, it is judged whether a second stop button has been on-manipulated (step 143). If the judgment result is "yes," a stop control is performed on one of the reels 3–5 corresponding to the on-manipulated button (step 144).

When any two reels have been stopped, a hit flag generation table like the one described above is generated and it is checked what kinds of hits may occur on what prize lines. If it is found that it is expected that a hit may occur on a certain prize line, then it is judged whether the number of prize lines on which a hit may occur is one (step 145). If the judgment result is "yes," the CPU 31 controls the speaker driving circuit 43 so that the speaker 39 emits a hit expectation sound A (step 146).

Figure 15A:
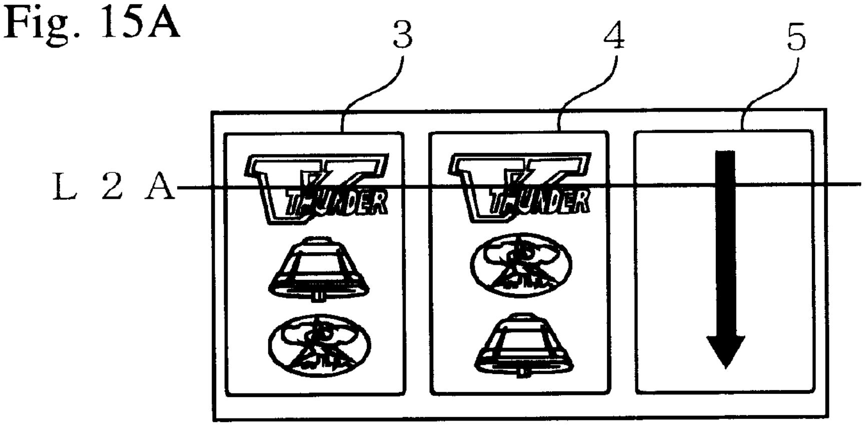
FIGS. 15A–15C are front views of the variable display device showing examples in which a hit expectation sound is generated for one prize line in the slot machine according to the third embodiment.
Figure 15B:
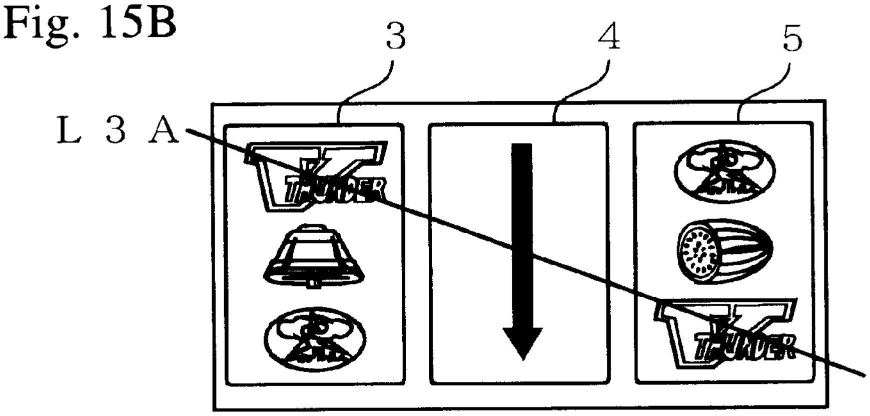
Figure 15C:
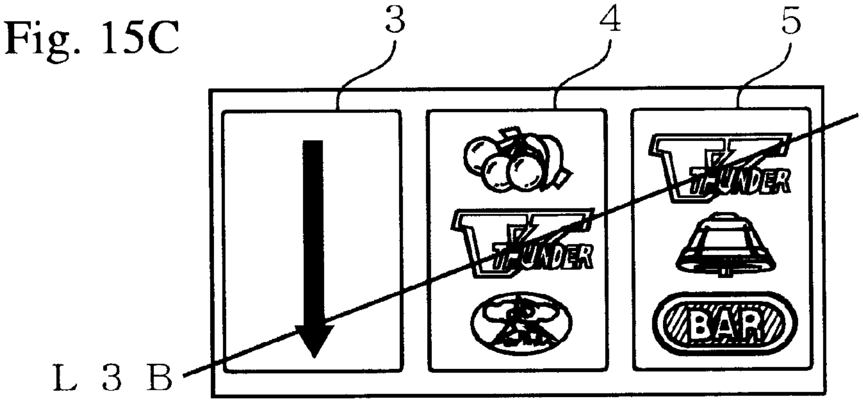

For example, the hit expectation sound A is generated when symbols "THUNDER V" are arranged on the one prize line L2A, L3A, or L3B as shown in FIGS. 15A–15C (which means that a hit is expected).

If the number of prize lines on which a hit may occur is not one, then it is judged whether the number is two (step 147). If the judgment result is "yes," the CPU 31 controls the speaker driving circuit 43 so that the speaker 39 emits a hit expectation sound B, which is different from the hit expectation sound A (step 148).

Figure 16A:
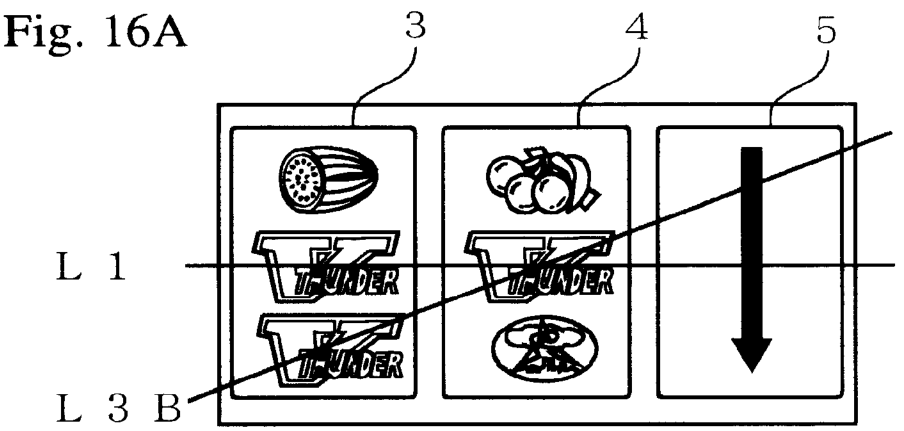
FIGS. 16A and 16B are front views of the variable display device showing examples in which a hit expectation sound is generated for two prize lines in the slot machine according to the third embodiment.
Figure 16B:
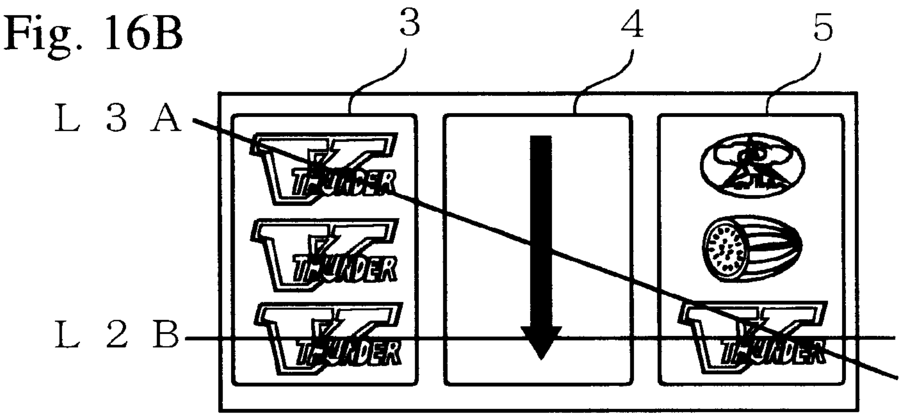

For example, the hit expectation sound B is generated when symbols "THUNDER V" are arranged on each of the two prize lines L1 and L3B as shown in FIG. 16A (which means that a hit is expected). Similarly, the hit expectation sound B is generated also when symbols "THUNDER V" are arranged on each of the two prize lines L3A and L2B as shown in FIG. 16B (which means that a hit is expected).

If the number of prize lines on which a hit may occur is not two, then it is judged whether the number is three (step 149 in FIG. 14). If the judgment result is "yes," the CPU 31 controls the speaker driving circuit 43 so that the speaker 39 emits a hit expectation sound C, which is different from the hit expectation sound A and B (step 150).

Figure 17:
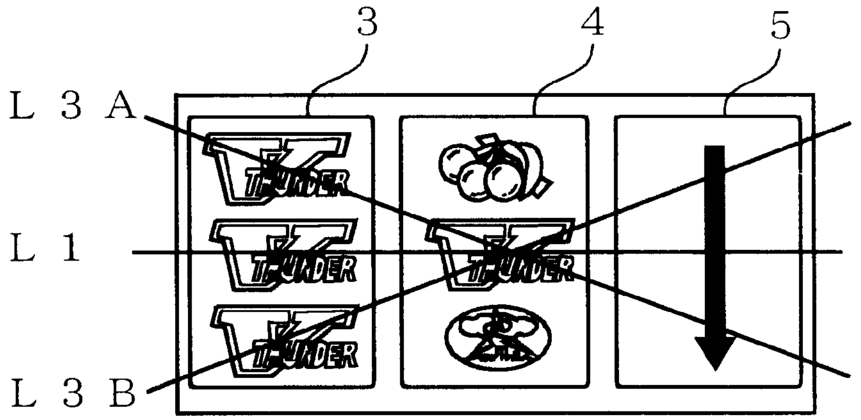
FIG. 17 is a front view of the variable display device showing an example in which a hit expectation sound is generated for three prize lines in the slot machine according to the third embodiment.

For example, the hit expectation sound C is generated when symbols "THUNDER V" are arranged on each of the three prize lines L3A, L1 and L3B as shown in FIG. 17 (which means that a hit is expected).

Then, it is judged whether an on-manipulation has been performed on the third stop button for the last one of the reels 3–5 (step 151). If the judgment result is "yes," the CPU 31 performs a stop control on the last reel corresponding to third stop button (step 152). Thereafter, the above-described hit judgment process (step 106 in FIG. 5) is executed, whereby whether a hit has occurred is judged for each of the effective prize lines.

In the third embodiment described above, one of the hit expectation sounds A–C is emitted from the speaker 39 in accordance with the number of prize lines on which a predetermined, prizewinning combination of symbols is expected to be arranged. Based on the hit expectation sound A, B, or C, a player can recognize the number of prize lines on which a predetermined combination of symbols is expected to be arranged.

Further, based on the thus-recognized number of prize lines, the player can recognize the degree of possibility that a hit may occur and hence can perform a game manipulation in accordance with the degree of possibility. That is, where the number of prize lines on which a hit may occur is small, he needs to perform seriously an on-manipulation on the last stop button. On the other hand, where the number of prize lines on which a hit may occur is large, he can perform an on-manipulation on the last stop button at ease.

That is, the player can quickly recognize whether the current game status allows him to play at ease. Therefore, the ease of operation of the slot machine 1 is improved.

In the stop control process for the reels 3–5, the CPU 31 performs a pull-in control of four frames. That is, even if a stop button is manipulated at a time point that is deviated from the correct one by four frames, the CPU 31 performs a control so that a symbol to constitute a prizewinning symbol combination will be pulled in so as to be stopped (displayed) on an effective prize line.

Therefore, for example, where there are a plurality of hit-expected prize lines (L1 and L3B) and a hit will occur if a proper symbol is stopped at the top or center frame of the third reel 5 that is to be stopped last as shown in FIG. 16A, a hit is more likely to occur. This will be explained below in more detail.

In the stop control process for the third reel 5, the CPU 31 performs a pull-in control of four frames as described above; that is, the third reel 5 is stop-controlled so that symbol "THUNDER V" is stopped (displayed) at the top frame even if the stop button is manipulated at a time point that is deviated from the correct one by four frames. In the case of FIG. 16A, symbol "THUNDER V" is stopped (displayed) at the center frame even if the stop button is manipulated at a time point that is further deviated from the correct one by one additional frame (five frames in total), to cause a hit. That is, a hit is more likely to occur.

Therefore, by recognizing the occurrence of such a situation by hearing the hit expectation sound B, a player can manipulate the last stop button at ease.

Although the above embodiments are directed to the case where the variable display device is constituted of the three reels 3–5, the variable display device may be configured in different manners. For example, the variable display devices may be configured by using a liquid crystal display device, a plasma display device, a CRT, a dot-type display device, 7-segment LED members, an electroluminescence display device, or the like.

Although the above embodiments are directed to the case where the invention is applied to a slot machine as a game machine, the invention is not limited to such a case and may be applied to, for example, pinball games, such as pachinko, having any of the above-mentioned variable display devices, as well as to other kinds of amusement equipment.

Those game machines having such configurations can provide the same effects as the slot machines of the embodiments.

Although the present invention has been explained in reference to the embodiments, it is apparent for those skilled in the art that many changes and modifications can be made without departing from the spirit and scope of the invention, as clear from the following claims.

What is claimed is:

1. A game machine comprising:

a variable display device for displaying various patterns in a variable manner in a plurality of columns;

a plurality of prize lines, each prize line being visually distinct from the other prize lines and relative to which the various patterns move, wherein each prize line defines a combination of patterns divided into the columns, and each pattern in each column moves and stops independently from the other patterns, a hit occurring when a predetermined combination of patterns is stopped and displayed on the prize lines; and hit expectation sound generating means for generating one of hit expectation sounds provided for each prize line and being different and distinct from the hit expectation sounds provided for other prize lines, when a condition that part of the predetermined combination of patterns are stopped and displayed on the prize lines is satisfied, in accordance with a kind of a prize line for which the condition is satisfied.

2. The game machine according to claim 1, wherein the game machine is a slot machine or a pinball machine.

3. The game machine according to claim 2, wherein:

the variable display device displays nine patterns in three rows and three columns;

the prize lines include a first prize line associated with a center row of the variable display device, a second prize line associated with a top row, a third prize line associated with a bottom row, a fourth prize line associated with a top-left position, a center position, and a bottom-right position, and a fifth prize line associated with a bottom-left position, the center position, and a top-right position; and the condition is that two of the predetermined patterns are stopped and displayed on any effective one of the prize lines.

4. The game machine according to claim 3, wherein the first prize line is rendered effective when one game medium is betted, the first, second, and third prize lines are rendered effective when two game media are betted, and all the prize lines are rendered effective when three game media are betted.

5. The game machine according to claim 4, further comprising stop buttons provided for the respective columns, for stopping variable display of the respective columns.

6. A game machine comprising:

a variable display device for displaying various patterns in a variable manner in a plurality of columns, each column being visually distinct from the other columns;

a plurality of prize lines, relative to which the various patterns move, wherein each prize line defines a combination of patterns divided into the columns, and wherein each pattern in each column moves and stops independently from the other patterns, a hit occurring when a predetermined combination of patterns is stopped and displayed on the prize lines; and hit expectation sound generating means for generating one of hit expectation sounds provided for each column and being different and distinct from the hit expectation sounds provided for other columns in accordance with a kind of a remaining column that continues to perform variable display, when a condition that part of the predetermined combination of patterns are stopped and displayed on the prize lines is satisfied.

7. The game machine according to claim 6, wherein the game machine is a slot machine or a pinball machine.

8. The game machine according to claim 7, wherein:

the variable display device displays nine patterns in three rows and three columns;

the prize lines includes a first prize line associated with a center row of the variable display device, a second prize line associated with a top row, a third prize line associated with a bottom row, a fourth prize line associated with a top-left position, a center position, and a bottom-right position, and a fifth prize line associated with a bottom-left position, the center position, and a top-right position; and the condition is that two of the predetermined combination of patterns are stopped and displayed on any effective one of the prize lines.

9. The game machine according to claim 8, wherein the first prize line is rendered effective when one game medium is betted, the first, second, and third prize lines are rendered effective when two game media are betted, and all the prize lines are rendered effective when three game media are betted.

10. The game machine according to claim 9, further comprising stop buttons provided for the respective columns, for stopping variable display of the respective columns.

11. A game machine comprising:

a variable display device for displaying various patterns in a variable manner in a plurality of columns;

a plurality of prize lines, relative to which the various patterns move, wherein each prize line defines a combination of patterns divided into the columns and wherein each pattern in each column moves and stops independently from the other patterns, a hit occurring when a predetermined combination of patterns is stopped and displayed on the prize lines;

a plurality of different prize line combinations including a prize line combination of only one prize line, and prize line combinations having two or more prize lines, wherein each prize line combination is visually distinct from the other prize line combinations; and hit expectation sound generating means for generating one of hit expectation sounds provided for each prize line combination and being different and distinct from the hit expectation sounds provided for other prize line combinations, when a condition that part of the predetermined combination of patterns are stopped and displayed on the prize lines is satisfied, in accordance with a kind of a prize line combination for which the condition is satisfied.

12. The game machine according to claim 11, wherein the game machine is a slot machine or a pinball machine.

13. The game machine according to claim 12, wherein:

the variable display device displays nine patterns in three rows and three columns;

the prize lines includes a first prize line associated with a center row of the variable display device, a second prize line associated with a top row, a third prize line associated with a bottom row, a fourth prize line associated with a top-left position, a center position, and a bottom-right position, and a fifth prize line associated with a bottom-left position, the center position, and a top-right position; and the condition is that two of the predetermined patterns are stopped and displayed on any effective one of the prize lines.

14. The game machine according to claim 13, wherein the first prize line is rendered effective when one game medium is betted, the first, second, and third prize lines are rendered effective when two game media are betted, and all the prize lines are rendered effective when three game media are betted.

15. The game machine according to claim 14, further comprising stop buttons provided for the respective columns, for stopping variable display of the respective columns.

16. The game machine according to claim 15, wherein when variable display of patterns of each column is stopped, the variable display device pulls in a pattern to constitute the predetermined combination of patterns and stops and displays the pulled-in pattern on one of the effective lines even if a player manipulates one of the stop buttons at a time point that is deviated from a correct time point by a predetermined number of frames.

17. The game machine according to claim 16, wherein the predetermined number is four.

* * * * *